United States Patent
Shao et al.

(10) Patent No.: US 11,831,598 B2
(45) Date of Patent: Nov. 28, 2023

(54) METHOD, APPARATUS AND SYSTEM FOR SWITCHING VIRTUAL IP

(71) Applicant: Beijing Baidu Netcom Science Technology Co., Ltd., Beijing (CN)

(72) Inventors: Yong Shao, Beijing (CN); Peilong Wang, Beijing (CN); Qingzhi Zhou, Beijing (CN); Bing Huang, Beijing (CN); Lanlan Pan, Beijing (CN)

(73) Assignee: BEIJING BAIDU NETCOM SCIENCE, TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/063,006

(22) Filed: Dec. 7, 2022

(65) Prior Publication Data

US 2023/0108522 A1   Apr. 6, 2023

(30) Foreign Application Priority Data

Jun. 16, 2022 (CN) .......................... 202210683349.4

(51) Int. Cl.
*G06F 15/16* (2006.01)
*H04L 61/103* (2022.01)
*H04L 12/46* (2006.01)
*H04L 69/164* (2022.01)

(52) U.S. Cl.
CPC ........ *H04L 61/103* (2013.01); *H04L 12/4641* (2013.01); *H04L 69/164* (2013.01); *H04L 2212/00* (2013.01)

(58) Field of Classification Search
CPC .. H04L 61/103; H04L 12/4641; H04L 69/164
See application file for complete search history.

(56) References Cited

U.S. PATENT DOCUMENTS

| | | | |
|---|---|---|---|
| 11,595,470 B1* | 2/2023 | Sun | H04L 67/1097 |
| 2007/0286089 A1* | 12/2007 | Nasle | G06F 30/20 |
| | | | 370/245 |
| 2015/0009992 A1* | 1/2015 | Zhang | H04L 12/4625 |
| | | | 370/392 |
| 2021/0064414 A1* | 3/2021 | Lolage | G06F 9/45541 |
| 2022/0210113 A1* | 6/2022 | Pillareddy | H04L 45/745 |
| 2023/0023429 A1* | 1/2023 | Arumugam | H04L 45/586 |

FOREIGN PATENT DOCUMENTS

| | | |
|---|---|---|
| CN | 112637105 A | 4/2021 |
| CN | 114244810 A | 3/2022 |
| EP | 2 536 068 A1 | 12/2012 |

* cited by examiner

*Primary Examiner* — Duyen M Doan
(74) *Attorney, Agent, or Firm* — Seed IP Law Group LLP

(57) ABSTRACT

The present disclosure provides a method, apparatus and system for switching a virtual IP, relates to the field of artificial intelligence and particularly to cloud computing and cloud network technologies, and can be applied to intelligent cloud scenarios. A detailed implementation comprises: receiving a free ARP packet sent by a virtual machine to which a high-availability virtual IP is successfully switched; generating a first forwarding table of the high-availability virtual IP according to the free ARP packet; encapsulating the first forwarding table in a first UDP packet by VXLAN; and synchronizing the first UDP packet to another virtual router.

14 Claims, 4 Drawing Sheets

METHOD, APPARATUS AND SYSTEM FOR SWITCHING VIRTUAL IP

CROSS-REFERENCE TO RELATED APPLICATIONS

This application claims priority to Chinese Patent Application No. 202210683349.4, filed with the China National Intellectual Property Administration (CNIPA) on Jun. 16, 2022, the content of which is incorporated herein by reference in its entirety.

TECHNICAL FIELD

The present disclosure relates to the field of artificial intelligence, and particularly to cloud computing and cloud network technologies, and can be applied to intelligent cloud scenarios.

BACKGROUND

A high-availability virtual IP (High-Availability Virtual IP Address, HaVip for short) is a private network IP resource that can be created and released independently. The HaVip can be used in conjunction with high-availability software (e.g., Keepalived), to build high-availability active and standby services, thereby improving the availability of service. There are various sources of demand for the HaVip at present. After migrating from an Underlay network to an Overlay network, traditional clients are required to perform a transformation and adapt to a load balancer or perform other compromise schemes, which makes the migration unsmooth. Some services are strongly dependent on the Havip mechanism, and thus, unable to migrate to the load balancer which will greatly hinder the migration to the overlay network (e.g., cloud). A large number of active and standby high-availability demands form Havip products for external sales. Here, in an Overlay scenario, traffic forwarding gateways are all deployed in a cluster mode. At present, it is difficult to solve the scenario where an Havip forwarding entry is quickly synchronized after an ARP (Address Resolution Protocol) is switched. In the prior art, a north/southbound interface channel needs to be invoked during active/standby switching, resulting in a long switching time.

SUMMARY

The present disclosure provides a method, apparatus and system for switching a virtual IP, a device, a storage medium and a computer program product.

According to a first aspect of the present disclosure, a method for switching a virtual IP is provided. The method includes: receiving a free ARP packet sent by a virtual machine to which a high-availability virtual IP is successfully switched; generating a first forwarding table of the high-availability virtual IP according to the free ARP packet; encapsulating the first forwarding table in a first UDP packet by VXLAN; and synchronizing the first UDP packet to another virtual router.

According to a second aspect of the present disclosure, an apparatus for switching a virtual IP is provided. The apparatus includes: a receiving unit, configured to receive a free ARP packet sent by a virtual machine to which a high-availability virtual IP is successfully switched; a generating unit, configured to generate a first forwarding table of the high-availability virtual IP according to the free ARP packet; an encapsulating unit, configured to encapsulate the first forwarding table in a first UDP packet by VXLAN; a synchronizing unit, configured to synchronize the first UDP packet to another virtual router.

According to a third aspect of the present disclosure, a system for switching a virtual IP is provided. The system includes: at least two virtual routers, configured to perform the method according to any one of the implementations described in the first aspect; and at least two virtual machines, configured to send a free ARP packet to a virtual router cluster.

According to a fourth aspect of the present disclosure, an electronic device is provided. The electronic device includes: at least one processor; and a storage device, in communication with the at least one processor, where the storage device stores instructions which, when executed by the at least one processor, enable the at least one processor to perform the method according to any one of the implementations described in the first aspect.

According to a fifth aspect of the present disclosure, a non-transitory computer readable storage medium is provided. The non-transitory computer readable storage medium stores computer instructions thereon, the computer instructions, when executed by a computer, cause the computer to perform the method according to any one of the implementations described in the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

According to the method, apparatus and system for switching a virtual IP provided in embodiments of the present disclosure, the high-availability virtual IP is bound to the virtual machine VM1 or VM2. Here, it is assumed that the high-availability virtual IP is bound to the virtual machine VM2. The free ARP of the high-availability virtual IP and ARP response packet with the gateway as its destination address are released at the Vswitch (virtual switch) side, and this type of ARP is directed to a Vrouter (virtual router). In the process of switching the high-availability virtual IP (e.g., switching the high-availability virtual IP from VM2 to VM1), the switching speed can be increased to the millisecond level.

Figure 1:
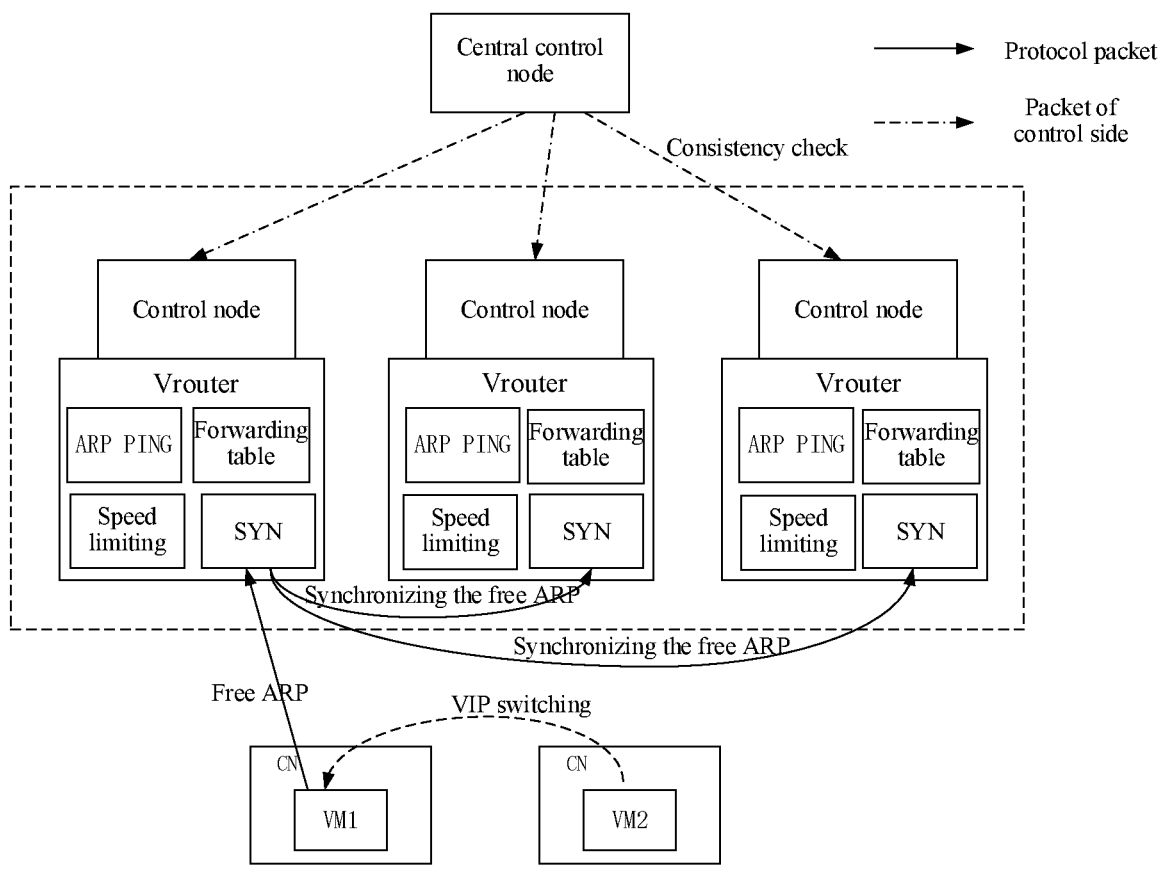
FIG. 1 illustrates an exemplary system architecture in which an embodiment of the present disclosure may be applied.

FIG. 1 illustrates an example system architecture 100 in which a method for switching a virtual IP or an apparatus for switching a virtual IP according to embodiments of the present disclosure may be applied.

As shown in FIG. 1, the system architecture may include a central control node, a control node, at least two virtual routers, and at least two virtual machines.

Each virtual machine is located at a different computing node (CN), and each computing node corresponds to one virtual switch. One of a plurality of virtual machines serves as a master virtual machine. After the Havip is switched to the master virtual machine, the master virtual machine sends a free ARP packet (including a <havip, mac, vtep> relationship) to a virtual router. Gratuitous ARP is also referred to as free ARP. The Gratuitous ARP differs from a general ARP request in that the Gratuitous ARP does not in expect to obtain a mac address corresponding to an ip but, when a host starts, the host sends a Gratuitous arp request, i.e., a request for a mac address of its own ip address.

The virtual router may receive the free ARP packet, and then generate a forwarding table of the high-availability virtual IP according to the free ARP packet. The forwarding table is then synchronized to another virtual router or other virtual routers.

The control node is used to control the virtual routers, and a forwarding table in a virtual router may be uploaded to the central control node, or a forwarding table unified by the central control node may be sent to the virtual router(s). Each virtual router updates its locally stored routing table after receiving the forwarding table sent from the control node, thereby achieving the consistency of the forwarding tables within a virtual router cluster. Accordingly, no matter the transaction data reaches any one of the virtual routers in the cluster, the transaction data will be correctly directed to the master virtual machine.

The central control node is capable of collecting the forwarding tables of the high-availability virtual IP from the control nodes in real time, and then a uniform forwarding table (a forwarding table which is most recent or a forwarding table with the highest appearing frequency may be selected, for example, three of five virtual routers report the same forwarding table, and then the forwarding table is used as the uniform forwarding table) may be selected therefrom, to be sent to all control nodes. Then, the uniform forwarding table is downloaded to the virtual routers by the control nodes.

In some alternative implementations of this embodiment, the at least two virtual machines are further configured to: send an ARP reply message in response to receiving an ARP PING packet. In this way, the virtual router actively initiates a master virtual machine detection, which can prevent the situation where the virtual router cannot learn the correct forwarding table due to the loss of the free ARP packet sent by the master virtual machine.

In some alternative implementations of this embodiment, the central control node is configured to collect forwarding table(s) of the high-availability virtual IP from the at least one virtual router, select a uniform target forwarding table therefrom, and send the target forwarding table to the at least one virtual router after adding a time stamp to the target forwarding table. If the physical network link between a virtual router and the virtual machine is disconnected, the time difference between the forwarding table in the virtual router and the forwarding table downloaded from the control node is large. Therefore, whether the physical network link between a virtual router and the virtual machine is disconnected can be detected by comparing the time difference between the forwarding tables.

Figure 2:
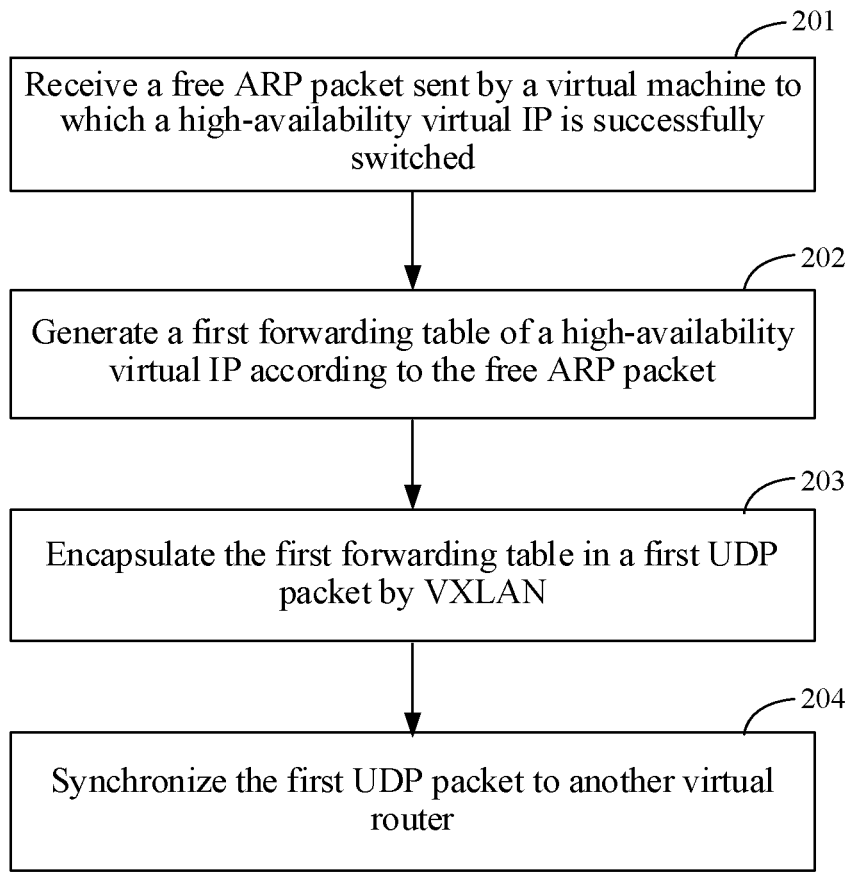
FIG. 2 is a flowchart of a method for switching a virtual IP according to an embodiment of the present disclosure.

Further referring to FIG. 2, FIG. 2 illustrates a flow 200 of a method for switching a virtual IP according to an embodiment of the present disclosure. Here, the method for switching a virtual IP includes the following steps:

Step 201, receiving a free ARP packet sent by a virtual machine to which a virtual IP is successfully switched.

In this embodiment, an executing body (e.g., the virtual router Vrouter shown in FIG. 1) of the method for switching a virtual IP may receive the free ARP packet through a wired or wireless physical network. In the process of switching a high-availability virtual IP (e.g., switching the high-availability virtual IP from VM2 to VM1), the VM1 generally sends a plurality of free ARP packets. The physical network adopts a 5-tuple HASH mechanism, and free ARP traffic arrives at only one Vrouter machine in a Vrouter cluster. The 5-tuple is source ip+destination ip+source port+destination port+protocol. The protocol may be a communication protocol such as TCP, UDP, and ICMP.

The free ARP packet includes havip, mac and vtep, and may further include vni.

Step 202, generating a first forwarding table of a high-availability virtual IP according to the free ARP packet.

In this embodiment, according to the <havip, mac, vtep> relationship in the free ARP packet, an HAVIP forwarding entry is generated for guiding forwarding. Currently, only a single Vrouter receives the free ARP packet and generates a forwarding table. In order to distinguish the forwarding table from forwarding tables generated according to other packets, the forwarding table generated according to the free ARP packet is named as the first forwarding table. Different forwarding tables may also be generated for different tenants (vni identifiers).

Step 203, encapsulating the first forwarding table in a first UDP packet by Virtual eXtensible Local Area Network (VXLAN for short).

In this embodiment, in order for the entire cluster to learn the entry, the Vrouter synchronizes the <havip, mac, vtep> relationship in the free ARP to all the Vrouters through an SYN (synchronization) unit without the need to establish a connection with the other Vrouters (the <havip, mac, vtep> relationship is encapsulated in the VXLAN and the inner layer is the UDP packet, the UDP data part being the above relationship information).

Step 204, synchronizing the first UDP packet to another virtual router.

In this embodiment, the synchronizing is not limited to a synchronization of a VXLAN packet in an independent multicast mode or in a gateway multicast mode. After receiving the synchronized <havip, mac, vtep> relationship, the another Vrouter generates an HAVIP entry for guiding forwarding. If the virtual router currently generating the forwarding table is configured to be in a multicast mode, the forwarding table may be directly synchronized to all virtual routers. If the virtual router currently generating the forwarding table is configured to be in a unicast mode, the forwarding table may be synchronized to the virtual router that is in the multicast mode, and the virtual router that is in the multicast mode sends a first UDP packet to all other virtual routers in synchronization. After receiving the first UDP packet, the another virtual router may parse out the <havip, mac, vtep> relationship from the first UDP packet. Thus, a forwarding table is obtained. When transaction data arrives at any virtual router, the virtual router may send the transaction data to the virtual machine corresponding to the virtual IP according to the forwarding table.

According to the method provided in the above embodiment of the present disclosure, when the high-availability virtual IP is bound to the VM2, all traffic accessing the high-availability virtual IP is forwarded to the VM2 through the Vrouter cluster, even if the other VMs at the same CN access the high-availability virtual IP. When the high-availability virtual IP is switched to the VM1, since the Vrouter adopts a data level synchronization mechanism to quickly synchronize the changed forwarding entry of high-availability virtual IP to all Vrouters (MS level), the traffic will be switched to the VM1 at the MS level. This is much faster than the mechanism where monitoring for the free ARP of the VM at the computing node and then invoking a north/southbound interface to perform the switching.

In some alternative implementations of this embodiment, the method further includes: receiving a third forwarding table of the high-availability virtual IP, the third forwarding table comprising a timestamp and being issued by a central control node; calculating a time difference between time of a locally stored first forwarding table and the timestamp; outputting, if the time difference is greater than a predetermined value, an alarm indicating physical network link failure. In order to find the problem caused by a physical network link failure, the CCTL (central control node) collects corresponding HAVIP entry <havip, mac, vtep, timestamp> in real time, each entry is followed by a timestamp of change. The CCTL then issues the entry to all virtual routers, and each virtual router performs a comparison according to this entry. If the difference value between the Timestamp and the current time is large, and results of many comparisons are "inconsistent," a failure notification will be performed. Therefore, the physical network link failure can be quickly and accurately detected, which helps to locate a problem.

In some alternative implementations of this embodiment, the synchronizing the first UDP packet to another virtual router includes: synchronizing a first predetermined number of first UDP packets to the another virtual router in unit time. To prevent an ARP attack, a certain speed limitation is performed on the ARP packet according to the HAVIP granularity of a tenant. For the free ARP packet, when the switching of the HAVIP causes an entry change, 5 packets can be continuously released in the first 0.1 ms.

In some alternative implementations of this embodiment, the synchronizing the second UDP packet to the another virtual router includes: synchronizing a second predetermined number of second UDP packets to the another virtual router in unit time. For the ARP reply initiated by the gateway for replying the ARP ING, 3 packets are released within 1 s. The second predetermined number is less than the first predetermined number, i.e., the speed of the free ARP is faster than that of the ARP reply message. Accordingly, ARP attacks can be prevented, thus ensuring that the network is safe and reliable.

Figure 3:
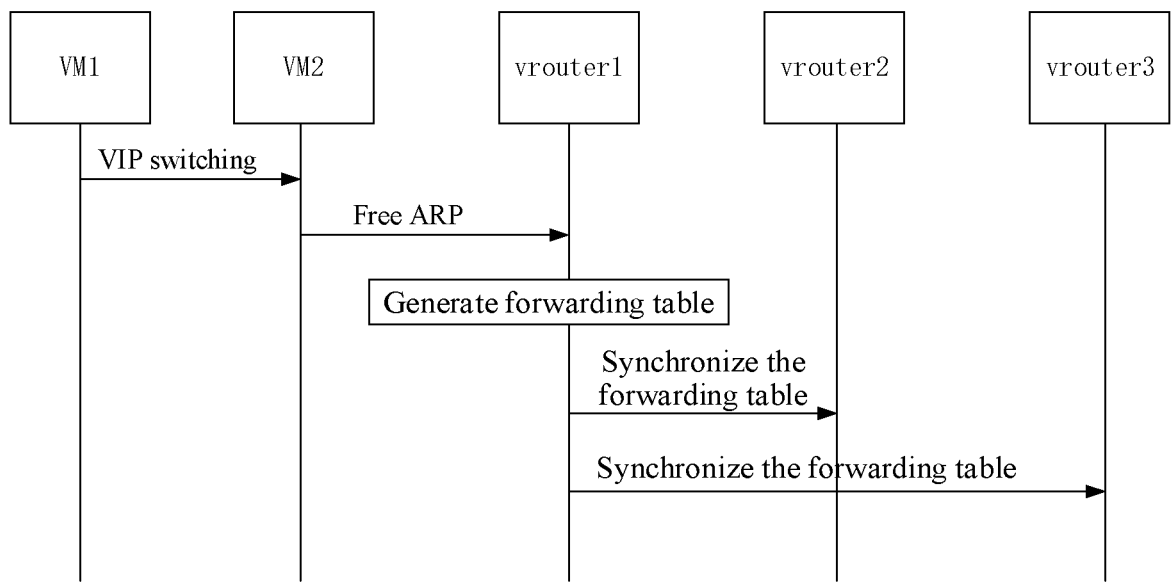
FIG. 3 is a schematic diagram of an application scenario of the method for switching a virtual IP according to embodiments of the present disclosure.

Further referring to FIG. 3, FIG. 3 a schematic diagram of an application scenario of the method for switching a virtual IP according to this embodiment. In the application scenario of FIG. 3, a virtual IP is switched from VM1 to VM2. The VM2 sends a free ARP to Vrouter1 calculated according to a 5-tuple HASH. The Vrouter1 generates a forwarding table based on the <havip, mac, vtep> relationship(s) in the free ARP, encapsulates the forwarding table into a UDP packet through VXLAN protocol, and sends the UDP packet to Vrouter2 and Vrouter3 in a multicast mode. The Vrouter2 and the Vrouter3 parse out the forwarding table from the UDP packet and store the forwarding table locally. Subsequent transaction data received by the Vrouter1, the Vrouter2 and the Vrouter3 are addressed to the VM2 through the forwarding table.

Figure 4:
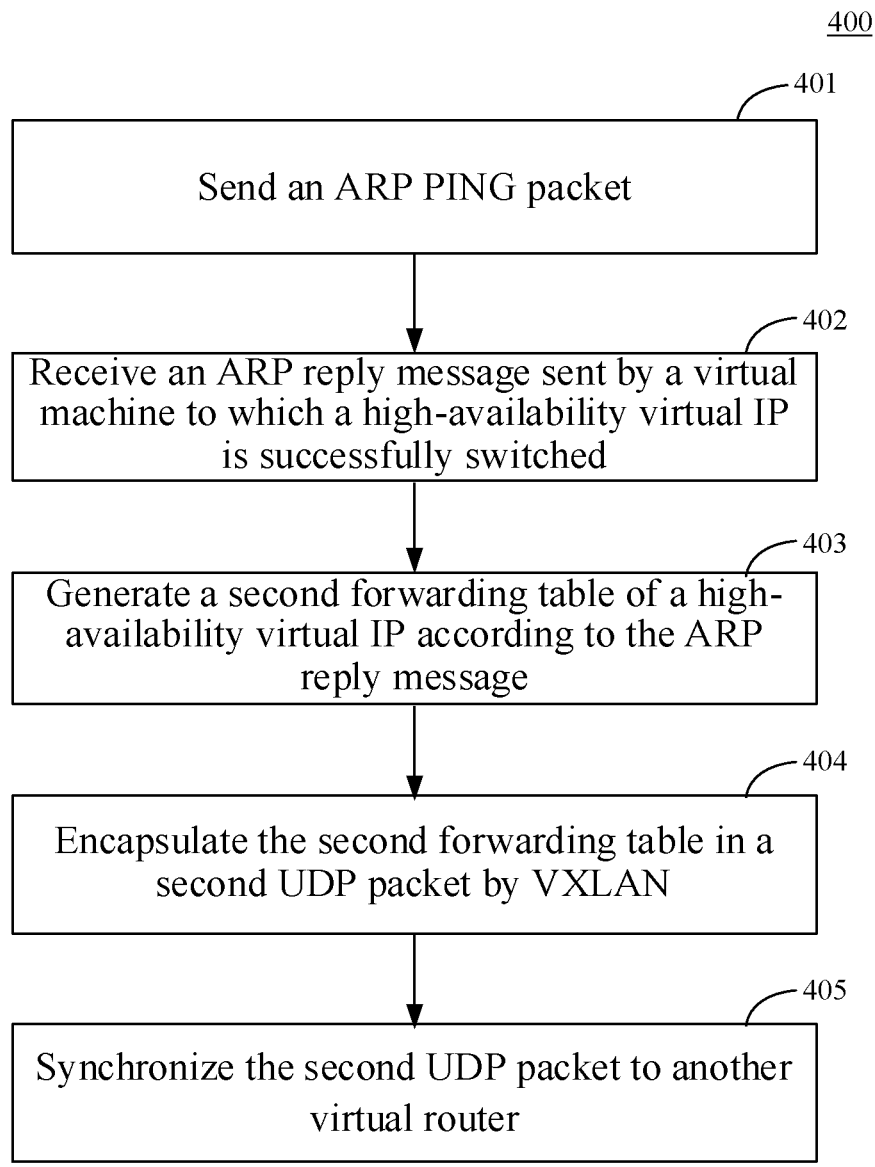
FIG. 4 is a flowchart of the method for switching a virtual IP according to another embodiment of the present disclosure.

Further referring to FIG. 4, FIG. 4 illustrates a flow 400 of the method for switching a virtual IP according to another embodiment. Here, the flow 400 of the method for switching a virtual IP includes the following steps:

Step 401, sending an ARP PING packet.

In this embodiment, an executing body (e.g., any virtual router Vrouter shown in FIG. 1) of the method for switching a virtual IP may send the ARP PING packet using Arping. The Arping is an ARP-level ping tool, which can be used to direct issuing a ping MAC address packet and find out which virtual machine has used the virtual IP.

Step 402, receiving an ARP reply message sent by a virtual machine to which a high-availability virtual IP is successfully switched.

In this embodiment, the virtual machine using the virtual IP will respond to the PING packet. The ARP reply message also includes havip, mac and vtep, and may further include vni. The virtual router receiving the ARP reply message is not necessarily the virtual router sending the ARP PING packet. Instead, which virtual router receives the ARP reply message may be determined by a 5-tuple HASH.

Step 403, generating a second forwarding table of the high-availability virtual IP according to the ARP reply message.

In this embodiment, according to the <havip, mac, vtep> relationship in the ARP reply message, a piece of HAVIP forwarding entry is generated for guiding forwarding. Currently, only a single Vrouter receives the ARP reply message and generates a forwarding table. In order to distinguish the forwarding table from forwarding tables generated according to other packets, the forwarding table generated according to the ARP reply message is named as the second forwarding table.

Step 404, encapsulating the second forwarding table in a second UDP packet by VXLAN.

In this embodiment, in order for the entire cluster to learn the entry, the Vrouter synchronizes the <havip, mac, vtep> relationship in the ARP reply message to all the Vrouters through an SYN (synchronization) unit without the need to establish a connection with the other Vrouters (the <havip, mac, vtep> relationship is encapsulated in the VXLAN and the inner layer is the UDP packet, the UDP data part being the above relationship information).

Step 405, synchronizing the second UDP packet to another virtual router.

In this embodiment, the synchronizing is not limited to a synchronization of a VXLAN packet in an independent multicast mode or in a gateway multicast mode. After receiving the synchronized <havip, mac, vtep> relationship, the another Vrouter generates an HAVIP entry for guiding forwarding. If the virtual router currently generating the forwarding table is configured to be in a multicast mode, the forwarding table may be directly synchronized to all virtual routers. If the virtual router currently generating the forwarding table is configured to be in a unicast mode, the forwarding table may be synchronized to the virtual router that is in the multicast mode, and the virtual router that is in the multicast mode sends a second UDP packet to all other virtual routers in synchronization. After receiving the second UDP packet, the another virtual router may parse out the <havip, mac, vtep> relationship from the second UDP packet. Thus, a forwarding table is obtained. When transaction data arrives at any virtual router, the virtual router may send the transaction data to the virtual machine corresponding to the virtual IP according to the forwarding table.

In some alternative implementations of this embodiment, the synchronizing the second UDP packet to another virtual router includes: synchronizing a second predetermined number of second UDP packets to the another virtual router in unit time. To prevent an ARP attack, a certain speed limitation is performed on the ARP packet according to the HAVIP granularity of a tenant. For the ARP reply initiated by the gateway for replying the ARP ING, 3 packets are released within 1 s. The second predetermined number is less than a first predetermined number, i.e., the speed of the free ARP is faster than that of the ARP reply message. Accordingly, ARP attacks can be prevented, thus ensuring that the network is safe and reliable.

It can be seen from FIG. 4 that, as compared with the embodiment corresponding to FIG. 2, the flow 400 of the method for switching a virtual IP in this embodiment reflects the step of performing a remediation on lost of the free ARP packet. Therefore, even if the free ARP packet is lost, the ARP response message can be obtained by the virtual router through an active ARP ING approach, thus obtaining the forwarding table. In addition to the free ARP switching caused by the switching, a Vrouter may be actively selected at random from the vouter cluster to send ARP ing, to detect all VMs to which the Havip will be bound at a second level, for example, the VM1 and the VM2 (of which the source addresses are the VM gateway addresses) in FIG. 3. The VM to which the Havip is bound will trigger an Havip Arp reply packet to a certain Vrouter according to an Arp request packet. At the same time, the Vrouter identifies the ARP response sent by the Vrouter gateway interface, to perform the learning in the steps of the flow 200, thereby achieving a self-healing capability.

Figure 5:
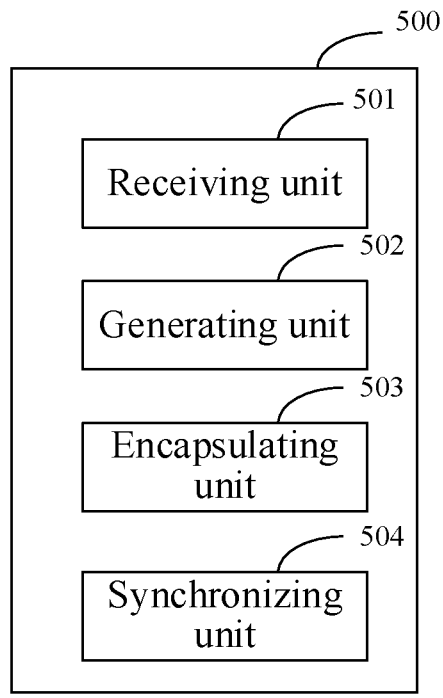
FIG. 5 is a schematic structural diagram of an apparatus for switching a virtual IP according to an embodiment of the present disclosure.

Further referring to FIG. 5, as an implementation of the method shown in the above drawings, the present disclosure provides an embodiment of an apparatus for switching a virtual IP. The embodiment of the apparatus corresponds to the embodiment of the method shown in FIG. 2, and the apparatus may be applied in various electronic devices.

As shown in FIG. 5, an apparatus 500 for switching a virtual IP in this embodiment includes: a receiving unit 501, a generating unit 502, an encapsulating unit 503 and a synchronizing unit 504. Here, the receiving unit 501 is configured to receive a free ARP packet sent by a virtual machine to which a high-availability virtual IP is successfully switched. The generating unit 502 is configured to generate a first forwarding table of the high-availability virtual IP according to the free ARP packet. The encapsulating unit 503 is configured to encapsulate the first forwarding table in a first UDP packet by VXLAN. The synchronizing unit 504 is configured to synchronize the first UDP packet to another virtual router.

In this embodiment, for detailed processes of the receiving unit 501, the generating unit 502, the encapsulating unit 503 and the synchronizing unit 504 in the apparatus 500 for switching a virtual IP, reference may be made to related descriptions of step 201, step 202, step 203 and step 204 in the corresponding embodiment of FIG. 2.

In some alternative implementations of this embodiment, the apparatus further includes: a detecting unit (not shown), configured to send an ARP PING packet. The receiving unit is further configured to: receive an ARP reply message sent by the virtual machine to which the high-availability virtual IP is successfully switched. The generating unit is further configured to: generate a second forwarding table of the high-availability virtual IP according to the ARP reply message. The encapsulating unit is further configured to: encapsulate the second forwarding table in a second UDP packet by the VXLAN. The synchronizing unit is further configured to: synchronize the second UDP packet to the another virtual router.

In some alternative implementations of this embodiment, the apparatus further includes: a network failure recovering unit (not shown), configured to: receive a third forwarding table of the high-availability virtual IP, the third forwarding table comprising a timestamp and being issued by a central control node; calculate a time difference between time of a locally stored first forwarding table and the timestamp; and output, if the time difference is greater than a predetermined value, an alarm indicating physical network link failure.

In some alternative implementations of this embodiment, the apparatus further includes: a speed limiting unit (not shown), configured to: send a first predetermined number of first UDP packets to the synchronizing unit in unit time. The synchronizing unit is further configured to synchronize the first UDP packets received from the speed limiting unit to the another virtual router.

In some alternative implementations of this embodiment, the apparatus further includes: the speed limiting unit, configured to: send a second predetermined number of second UDP packets to the synchronizing unit in unit time. The synchronizing unit is further configured to synchronize the second UDP packets received from the speed limiting unit to the another virtual router.

In the technical solution of the present disclosure, the collection, storage, use, processing, transmission, provision, disclosure, etc. of the personal information of a user all comply with the provisions of the relevant laws and regulations, and do not violate public order and good customs.

According to an embodiment of the present disclosure, an electronic device, a readable storage medium and a computer program product are provided.

An electronic device includes at least one processor, and a storage device in communication with the at least one processor. Here, the storage device stores instructions executable by the at least one processor, and the instructions are executed by the at least one processor, to enable the at least one processor to perform the method according to the flow 200 or 400.

A non-transitory computer readable storage medium stores computer instructions. Here, the computer instructions, when executed by a computer, cause the computer to perform the method according to the flow 200 or 400.

A computer program product includes a computer program. The computer program, when executed by a processor, cause the processor to implement the method according to the flow 200 or 400.

Figure 6:
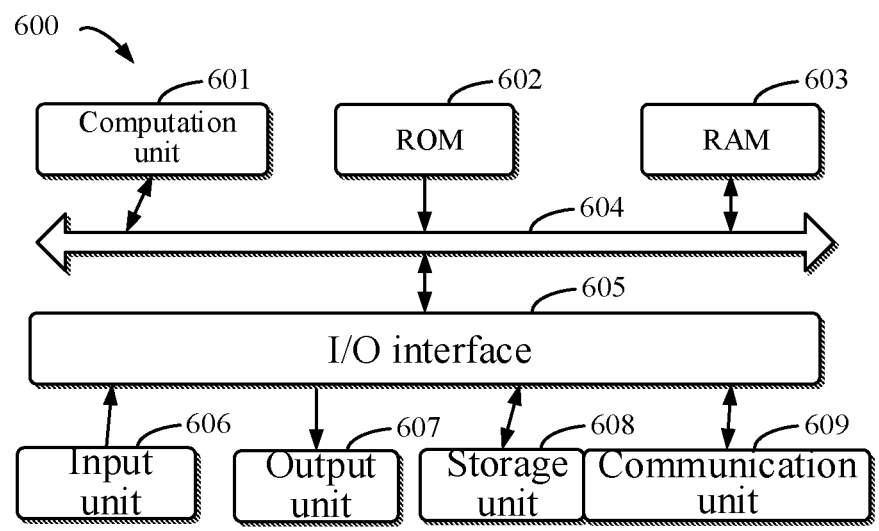
FIG. 6 is a schematic structural diagram of a computer system of an electronic device adapted to implement embodiments of the present disclosure.

FIG. 6 is a schematic block diagram of an example electronic device 600 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computation unit 601, which may perform various appropriate actions and processing, based on a computer program stored in a read-only memory (ROM) 602 or a computer program loaded from a storage unit 608 into a random access memory (RAM) 603. In the RAM 603, various programs and data required for the operation of the device 600 may also be stored. The computation unit 601, the ROM 602, and the RAM 603 are connected to each other through a bus 604. An input/output (I/O) interface 605 is also connected to the bus 604.

A plurality of parts in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computation unit 601 may be various general-purpose and/or dedicated processing components having processing and computing capabilities. Some examples of the computation unit 601 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 601 performs the various methods and processes described above, such as a method for switching a virtual IP. For example, in some embodiments, the method for switching a virtual IP may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computation unit 601, one or more steps of the method for switching a virtual IP described above may be performed. Alternatively, in other embodiments, the computation unit 601 may be configured to perform the method for switching a virtual IP by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host. It is a host product in the cloud computing service system to solve the defects of the traditional physical host and virtual private server (VPS) services, such as high management difficulty and weak business scalability.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for switching a virtual IP, executed by a first virtual router, comprising:
   receiving a free ARP packet sent by a virtual machine to which a high-availability virtual IP is successfully switched; generating a first forwarding table of the high-availability virtual IP according to the free ARP packet and storing the first forwarding table locally;
   encapsulating the first forwarding table into a first UDP packet by VXLAN;
   synchronizing the first UDP packet to a second virtual router, for the second virtual router to parse out the first forwarding table from the first UDP packet and store the first forwarding table on the second virtual router, wherein when traffic aiming at accessing the high-availability virtual IP reaches any one of the virtual routers the traffic is forwarded to the virtual machine through the first forwarding table;
   receiving a second forwarding table of the high-availability virtual IP, the second forwarding table comprising a timestamp and being issued by a central control node;
   calculating a time difference between a time of the first forwarding table locally stored at the first virtual router and the timestamp of the second forwarding table issued by the central control node; and
   outputting, in response to determining that the time difference is greater than a predetermined value, an alarm indicating failure of a physical network link between the first virtual router and the virtual machine.

2. The method according to claim 1, further comprising:
   sending an ARP PING packet;
   receiving an ARP reply message sent by the virtual machine to which the high-availability virtual IP is successfully switched;
   generating a third forwarding table of the high-availability virtual IP according to the ARP reply message;
   encapsulating the third forwarding table in a second UDP packet by the VXLAN; and
   synchronizing the second UDP packet to the second virtual router.

3. The method according to claim 1, wherein the free ARP packet includes the high-availability virtual IP, a Media Access Control (MAC) address of the virtual machine, and a VXLAN Tunnel Endpoint (vtep) of the virtual machine.

4. The method according to claim 1, wherein the synchronizing the first UDP packet to a second virtual router comprises:
   synchronizing, in unit time, a first predetermined number of first UDP packets to the second virtual router.

5. The method according to claim 2, wherein the synchronizing the second UDP packet to the second virtual router comprises:
   synchronizing, in unit time, a second predetermined number of second UDP packets to the second virtual router.

6. An apparatus for switching a virtual IP, comprising:
   at least one processor; and
   a storage device, in communication with the at least one processor, wherein the storage device stores instructions which, when executed by the at least one processor, enable the at least one processor to perform operations, the operations comprising:
   receiving, by a first virtual router, a free ARP packet sent by a virtual machine to which a high-availability virtual IP is successfully switched;
   generating a first forwarding table of the high-availability virtual IP according to the free ARP packet and storing the first forwarding table locally; encapsulating the first forwarding table into a first UDP packet by VXLAN;
   synchronizing the first UDP packet to a second virtual router, for the second virtual router to parse out the first forwarding table from the first UDP packet and store the first forwarding table on the second virtual router, wherein when traffic aiming at accessing the high-availability virtual IP reaches any one of the virtual routers the traffic is forwarded to the virtual machine through the first forwarding table;
   receiving a second forwarding table of the high-availability virtual IP, the second forwarding table comprising a timestamp and being issued by a central control node;
   calculating a time difference between a time of the first forwarding table locally stored at the first virtual router and the timestamp of the second forwarding table issued by the central control node; and
   outputting, in response to determining that the time difference is greater than a predetermined value, an alarm indicating failure of a physical network link between the first virtual router and the virtual machine.

7. The apparatus according to claim 6, wherein the operations further comprise:
   sending an ARP PING packet,
   receiving an ARP reply message sent by the virtual machine to which the high-availability virtual IP is successfully switched,
   generating a third forwarding table of the high-availability virtual IP according to the ARP reply message,
   encapsulating the third forwarding table in a second UDP packet by the VXLAN, and
   synchronizing the second UDP packet to the second virtual router.

8. The apparatus according to claim 6, wherein the free ARP packet includes the high-availability virtual IP, a Media Access Control (MAC) address of the virtual machine, and a VXLAN Tunnel Endpoint (vtep) of the virtual machine.

9. The apparatus according to claim 6, wherein the synchronizing the first UDP packet to a second virtual router comprises:
synchronizing, in unit time, a first predetermined number of first UDP packets to the second virtual router.

10. The apparatus according to claim 7, wherein the synchronizing the second UDP packet to the second virtual router comprises:
synchronizing, in unit time, a second predetermined number of second UDP packets to the second virtual router.

11. A system for switching a virtual IP, comprising:
at least two virtual machines, configured to send a free ARP packet to a virtual router cluster;
the virtual router cluster comprising at least two virtual routers, each of the at least two virtual routers comprises:
at least one processor;
a storage device, in communication with the at least one processor; wherein the storage device stores instructions which, when executed by the at least one processor, enable the at least one processor to perform operations, the operations comprising:
receiving a free ARP packet sent by a virtual machine to which a high-availability virtual IP is successfully switched;
generating a first forwarding table of the high-availability virtual IP according to the free ARP packet and storing the first forwarding table locally; encapsulating the first forwarding table in a first UDP packet by VXLAN; and
synchronizing the first UDP packet to another virtual router, for the another virtual router to parse out the first forwarding table from the first UDP packet and store the first forwarding table on the another virtual router, wherein when traffic aiming at accessing the high-availability virtual IP reaches any one of the virtual routers the traffic is forwarded to the virtual machine through the first forwarding table;
receiving a second forwarding table of the high-availability virtual IP, the second forwarding table comprising a timestamp and being issued by a central control node;
calculating a time difference between a time of the first forwarding table locally stored at each virtual router and the timestamp of the second forwarding table issued by the central control node; and
outputting, in response to determining that the time difference is greater than a predetermined value, an alarm indicating failure of a physical network link between the virtual router and the virtual machine.

12. The system according to claim 11, wherein each of the at least two virtual machines are further configured to:
send an ARP reply message in response to receiving an ARP ING packet.

13. The system according to claim 11, further comprising:
the central control node, configured to collect a forwarding table of a high-availability virtual IP from at least one virtual router, select a uniform target forwarding table therefrom, and send the target forwarding table to the at least one virtual router after adding a time stamp to the target forwarding table.

14. The method according to claim 2, wherein the method further comprises:
synchronizing, in unit time, a first predetermined number of first UDP packets to the second virtual router; and
synchronizing, in unit time, a second predetermined number of second UDP packets to the second virtual router;
wherein the second predetermined number is less than the first predetermined number.

* * * * *